Feb. 3, 1970          D. H. DULEBOHN          3,493,762
            TRACING MACHINE HAVING TOOL OFFSET
            INDEPENDENT OF THE SCANNING HEAD
Filed Feb. 27, 1967                    8 Sheets-Sheet 1

INVENTOR.
DAVID H. DULEBOHN
BY
Williamson, Palmatier & Bains
ATTORNEYS

Feb. 3, 1970

D. H. DULEBOHN 3,493,762

TRACING MACHINE HAVING TOOL OFFSET
INDEPENDENT OF THE SCANNING HEAD

Filed Feb. 27, 1967

INVENTOR.
DAVID H. DULEBOHN
BY
Williamson, Palmatier & Bains
ATTORNEYS

INVENTOR.
DAVID H. DULEBOHN

FIG. 5

Feb. 3, 1970  D. H. DULEBOHN  3,493,762
TRACING MACHINE HAVING TOOL OFFSET
INDEPENDENT OF THE SCANNING HEAD

Filed Feb. 27, 1967  8 Sheets-Sheet 6

INVENTOR.
DAVID H. DULEBOHN
BY
Williamson, Palmatier & Bains
ATTORNEYS

Feb. 3, 1970

D. H. DULEBOHN 3,493,762

TRACING MACHINE HAVING TOOL OFFSET
INDEPENDENT OF THE SCANNING HEAD

Filed Feb. 27, 1967

INVENTOR.
DAVID H. DULEBOHN
BY
Williamson, Palmatier & Bains
ATTORNEYS

United States Patent Office 3,493,762
Patented Feb. 3, 1970

---

3,493,762
TRACING MACHINE HAVING TOOL OFFSET INDEPENDENT OF THE SCANNING HEAD
David H. Dulebohn, Minneapolis, Minn., assignor to Andrew Engineering Company, Minneapolis, Minn., a corporation of Minnesota
Filed Feb. 27, 1967, Ser. No. 618,835
Int. Cl. G05b 1/00, 11/00
U.S. Cl. 250—202                                    10 Claims

ABSTRACT OF THE DISCLOSURE

A tracer and control system wherein a scanner moves along the line drawing and transmits, by means of a flexible coherent fiber optics bundle, an image to a stationary head on the frame which maintains itself at an orientation corresponding to the direction of the line at the scanner. The image is split at the head rotation axis for viewing forwardly and rearwardly along the line. Mechanical rotation at the head is translated into error signals in synchro control systems of the X axis and Y axis lead screws of the tracer and slave machine. An additional error signal is introduced into the synchro control system of the slave machine for changing the pattern followed by the tool to compensate for the working reach or radius of the tool.

---

This invention relates to a tracing machine and to a control system providing completely controlled operation of a slave machine such as a vertical spindle milling machine for producing a periphery on a workpiece corresponding to the shape of a line drawing which is traced.

The only important known prior art is United States Patent No. 2,989,639.

In the past, it has been necessary to make the line drawing to be traced with a size somewhat different than the size of the workpiece to be ultimately produced in order to produce the relative movement between the workpiece and the tool so as to compensate for the working reach of the tool or radius of the tool in the case of a milling machine or similar types of tools. In tracing machines vastly different from the present type of machine, attempts have been made to offset the optical image of the line being traced to allow for the tool radius but it can be readily understood that such types of compensation become unsuitable when the workpiece being formed is enlarged or reduced relative to the drawing by a predetermined ratio.

Additionally, it has been necessary in the past, in order to produce reverse running of the tracer along the line, to reorient the head by turning it through an arc of 180°, followed by running of the tracer in the normal condition. However, the complicated procedures in turning the head through a half revolution in order to change the direction of operation has added considerably to the burden of operating the machine. Also it has not been possible to compensate for tool radius when such reorientation of the head was necessary. In obtaining a rapid response in relation to the sensed changes in the direction of the line, it is very desirable to keep the weight of the moving parts which move along the line drawing at a minimum. With added refinements and mechanisms, past tracing machines have necessarily increased the amount of weight which had to be moved in following the line drawing.

With these comments in mind, it is to the elimination of these and other disadvantages, together with the inclusion therein of other novel and desirable features.

An object of my invention is the provision of a tracing machine having a new and novel image to signal translator permitting instantaneous reversal in the direction of following along the line drawing by continuously receiving images of a portion of the line spaced fore and aft of each other and selectively responding to said images for following in fore and aft directions along the line.

Another object of my invention is to provide an improved tracing machine having a lightweight and highly mobile scanner to view and follow a line drawing and to apply an image of a portion of the line to a stationary translator remote from the scanner and producing signals controlling the movement of the scanner and of a tool in a slave machine.

A further object of my invention is to provide in a tracing machine for following a line drawing and controlling a slave machine, a new and novel slave machine control-signal-producing mechanism responding to the image of the line drawing and producing a control signal to cause the edge of the cutting tool in the slave machine to follow, relative to the workpiece, the contour of the line on the tracing machine.

These and other objects and advantages of my invention will more fully appear from the following description made in connection with the accompanying drawings, wherein like reference characters refer to the same or similar parts throughout the several views, and in which:

Figures 1, 2:
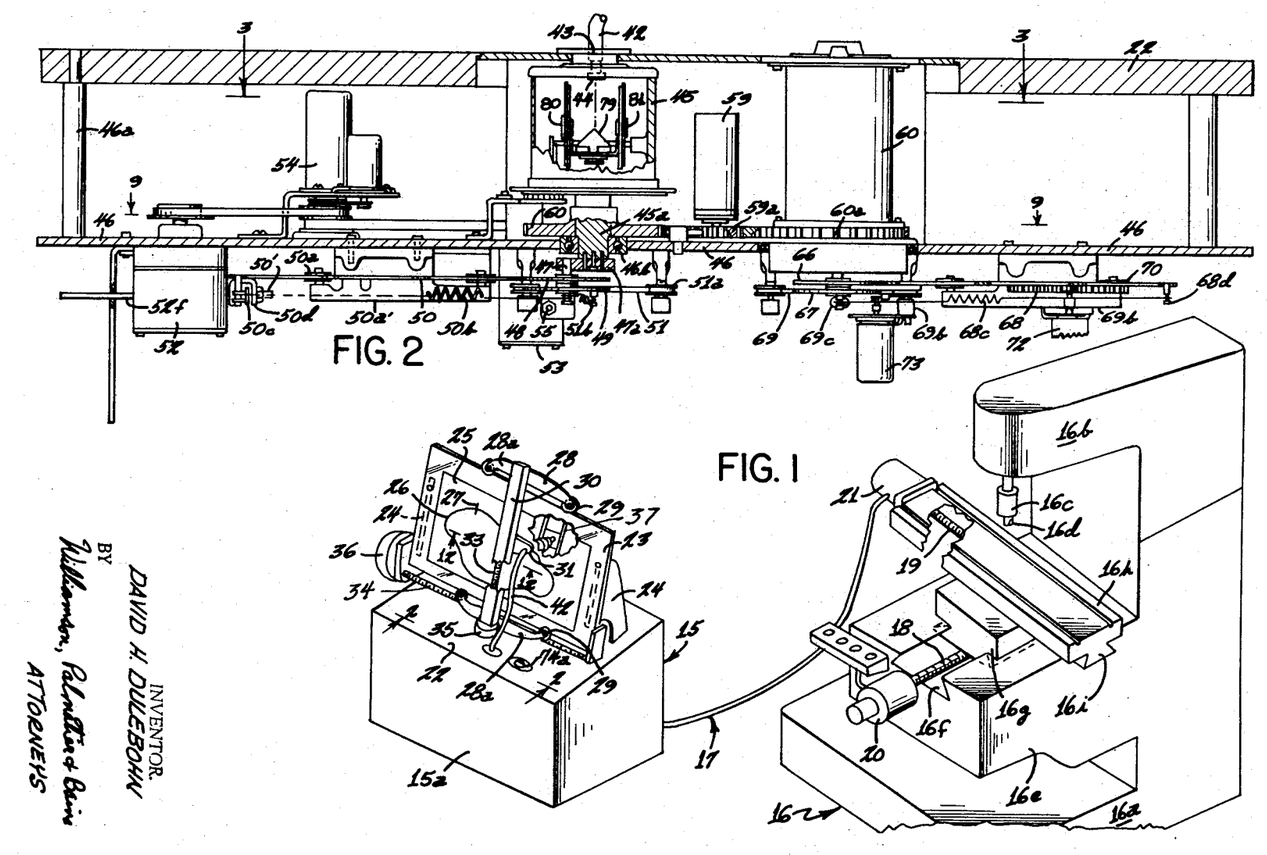
FIG. 1 is a somewhat diagrammatic perspective view illustrating the tracing machine and one form of slave machine which may be used in connection therewith.
FIG. 2 is an enlarged detail section view of a portion of the control mechanism as viewed at 2—2 in FIG. 1.
Figure 3:
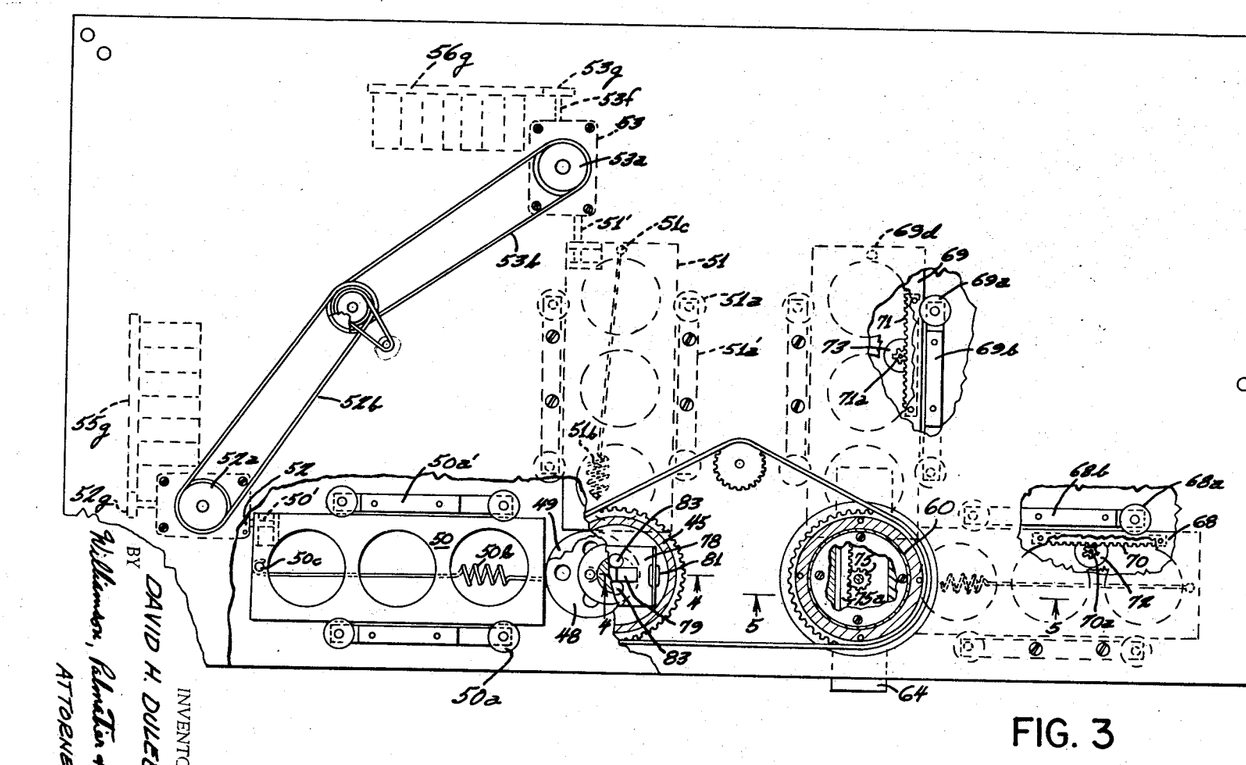
FIG. 3 is a section view taken approximately at 3—3 in FIG. 2 with portions broken away.
Figure 4:
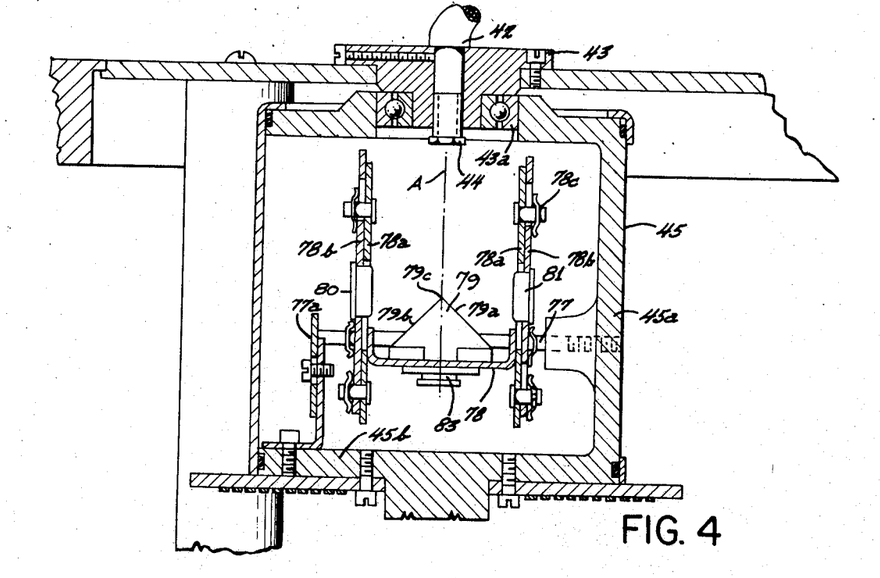
FIG. 4 is an enlarged detail section view taken approximately at 4—4 in FIG. 3.
Figure 5:
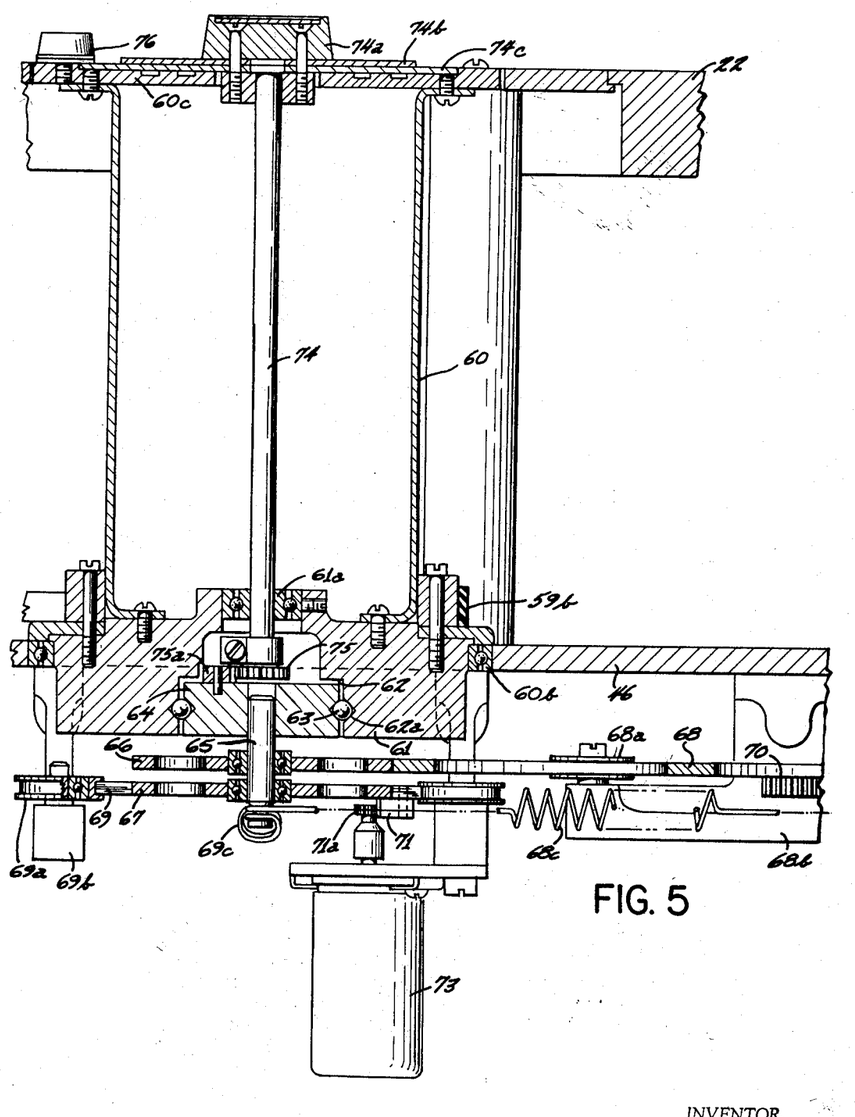
FIG. 5 is an enlarged detail section view taken approximately at 5—5 in FIG. 3.
Figure 6:
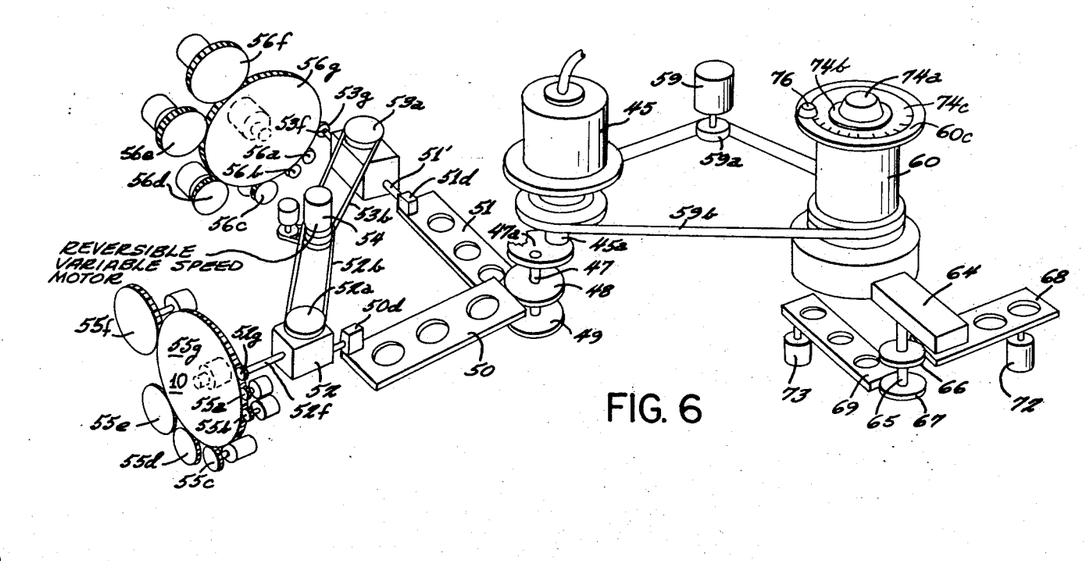
FIG. 6 is a diagrammatic perspective view showing important portions of the control mechanism.

One form of the present invention is shown in the drawings and is described herein. In FIG. 1, the tracing machine is indicated in general by numeral 15, and the slave machine is indicated in general by numeral 16. The tracing machine and slave machine may be located adjacent each other, or may be disposed at relatively remote locations. The tracing machine is connected to the slave machine by a multiple conductor cable 17 to provide for transmission of the several control signals. The slave machine 16 has a base 16 a, a spindle head 16b from which a rotary chuck 16c is driven for revolving a tool 16d.

It will be understood that the tool could be any of a number of the types of tools for performing work upon a workpiece. A grinding tool might be provided for putting a desired finish on the workpiece; or the tool might comprise a gas flame cutting torch, the working reach of which would be the distance to the edge of the intense heat which has workpiece-melting effect.

The slave machine 16 also has a vetically adjustable table 16e provided with a guideway 16f in which the slide 16g is movably mounted. The slide 16g is moved along the guideway by a lead screw 18 which is connected to the slide 16g by means of a threaded nut or other equivalent precision device. The slide 16g mounts a workpiece-mounting bed 16h which is provided with a dovetail guide 16i for sliding in a comparably shaped dovetail guideway in the slide 16g to permit the bed 16h to be moved in a direction normal to the movement of slide 16g. The bed 16h carries a rotable lead screw 19 which is rotatable for moving the bed 16h. A stationary nut will be affixed in the slide 16g to effect the movement of the bed 16h along the X-axis in the direction of the lead screw.

It will be noted that reversible servo-motors 20 and 21 are mounted on the slave machine and connected to the ends of the lead screws 18 and 19 for operating these lead screws.

The tracer 15 has a base 15a which has a top deck 22 supporting the primary operating apparatus of the tracer.

A generally upright, but slightly inclined glass panel 23 is suspended upon upright mounts 24 with the lower edge of the glass panel spaced upwardly from the deck 22. The glass panel 23 facilitates mounting of a line drawing 25 so that the contour or line 26 thereon may be viewed and traced. The line drawing may have one or more lines 27 crossing the main contour 26 for purposes of locating the tool 16d at a desired center and then causing the tool to stop at the center until the tracing is permitted to continue.

Figure 12:
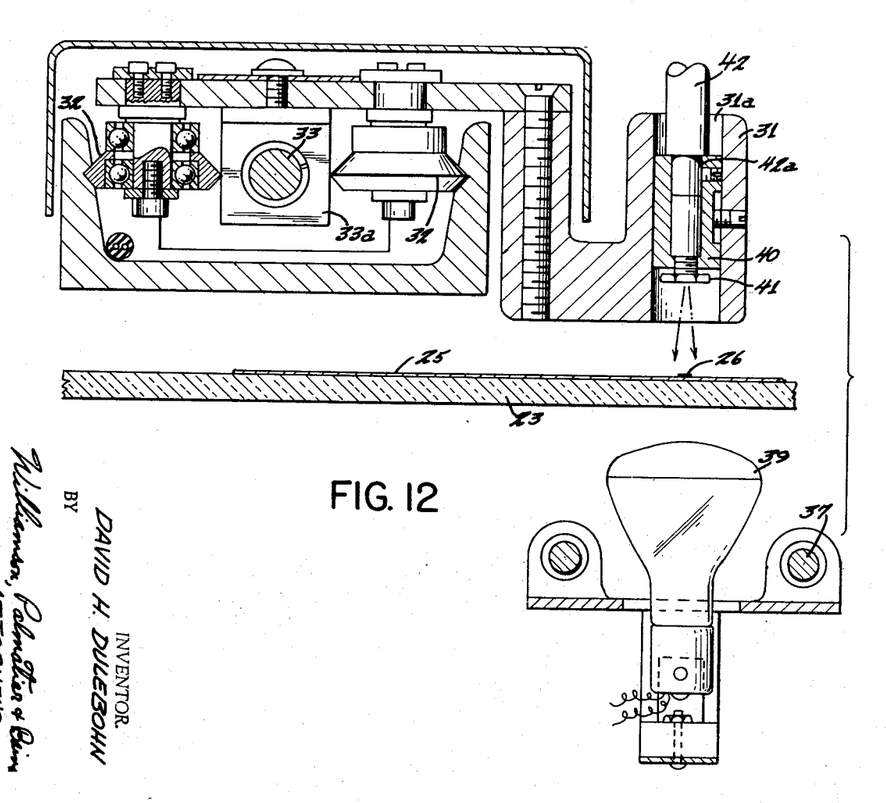
FIG. 12 is a greatly enlarged detail section view taken approximately at 12—12 in FIG. 1.

The tracer has a rigid carriage 28 with rollers 29 riding the precision linear parallel upper and lower edges of the glass plate 23. The carriage 28 has upper and lower cross heads 28a and a rigid interconecting upright track 30. A follower head 31 (see FIG. 12) is movable along the track 30 on precision rollers 32, and the movement is produced by a Y-axis lead screw 33 which is connected to the head by a nut 33a affixed on the follower head.

The carriage 28 is moved along the glass panel 23 by and X-axis lead screw 34 supported from opposite ends of the glass panel 23 in suitable bearings. The lead screws 33 and 34 are respectively rotated by reversible servo-motors 35 and 36 respectively in order to cause the following head to move along the line drawing.

The carriage 28 is also provided with a pair of upright guide rods 37 at the rear of the glass plate 23 and mounting a slidable bracket 38 carrying a lightbulb 39 immediately behind the follower head 31 and applying an intense light through the glass to the drawing 25.

The line following head 31 has an opening 31a therein wherein a fitting 40 is affixed by a set screw and carries a lens assembly 41 to direct an image of a minute length or reference portion of the line 26 (shown greatly enlarged in FIG. 12) into the end 42a of an elongate flexible coherent fiber optics bundle 42 which moves with the line following head 31 and transmits the image of the minute reference portion of the line 26 therethrough. Such a coherent fiber optics bundle is a known commercially available product, such as that sold by American Optical Co., of Southbridge, Mass., and consists of a large number of minute cylindrical glass fibers of high optical quality clustered together into a bundle and wherein the fibers are located in a precise pattern in the bundle, identical at each end so that the image formed on the entrance face of the bundle, at the follower head 31, is produced as a mosaic of the image at the opposite or exit face or end.

The opposite or exit end of the coherent fiber optics bundle 42 is secured in a fitting 43 which is affixed by screws to the deck 22 of the tracer. It will be noted that the fitting 43 is located substantially centrally of the deck 22 so that the flexible fiber optics bundle 42 may reach the follower head 31 in any position thereof as the carriage 28 may travel from end to end on the glass plate 23 and the follower head 31 may travel upwardly and downwardly along the track 30.

The fitting 43 also carries a stationary lens assembly 44 to receive the image from the fiber optics bundle 42 and pass the image into the rotary head 45 along the rotation axis thereof.

A head mounting panel 46 is suspended from the deck 22 by a plurality of posts 46a. The panel 46 carries a bearing 46b which mounts the depending spindle 45a of the head 45 to facilitate rotation of the head with respect to the panel 46 and with respect to the fitting 43 which is provided with a bearing 43a maintaining the upper portion of head 45 in coaxial relation with respect to the lens assembly 44.

A crank pin 47 is mounted eccentrically of the head 45 by a crank arm 47a which is affixed to the end of the spindle 45a. The crank pin 47 carries a pair of rotatable discs 48 and 49 which respectively abut, in edge to edge relation, slide plates 50 and 51 respectively. The slide plates 50 and 51 are respectively guided for linear sliding movement, by guide rollers 50a and 51a respectively and in directions normal to each other. Coil springs 50b and 51b are both connected at one end to crank pin 47, and at their other ends are connected to anchor pins 50c and 51c respectively, so as to continuously urge the slide plates 50 and 51 against the edges of the discs 48 and 49 respectively.

Figure 7:
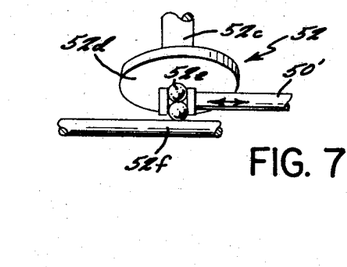
FIG. 7 is a greatly enlarged diagrammatic sketch of the principal parts of a ball disc integrator is employed in the present invention.

The slide plates 50 and 51 are connected by means of fittings 50d and 51d respectively to the slidable control rods 50' and 51' of the ball disc integrators 52 and 53 respectively. The construction and operation of ball disc integrators 52 and 53 is well understood by persons of skill in the art, and the rudiments thereof are illustrated in FIG. 7 wherein the ball disc integrator 52 is illustrated, it being understood that the integrator 53 is of identical construction. Rotary motion is supplied through a pulley 52a from a reversible variable speed motor 54 and through the belt 52b. Rotary motion from the pulley 52a is applied through a shaft 52c to a disc 52d. The endwise motion of the control rod 50' is across a diameter of the rotary disc 52d and the balls 52e carried by the control rod 50' rotate at a rate which is a function of the speed of the disc 52d and of the distance between the center of rotation of the disc 52d and the balls 52e. The rotary motion is transmitted from the disc 52d through the balls 52e and to the output shaft 52f. It will be seen that the rotary motion at the shaft 52f may be in either direction and at a wide range of speeds, depending upon the position of the control rod 50'.

Likewise at the ball disc integrator 53, rotary motion is supplied through the pulley 53a from the motor 54 and through the drive belt 53b. The output from the integrator 53 is at the shaft 53f which varies in speed and direction in relation to the position of the control rod 51' and the slide plate 51, and operation of motor 54.

It will be noted that the slide plate mounting rollers 50a and 51a are suspended from the panel 46 on fittings 50a' and 51a'. The ball disc integrators 52 and 53 are affixed to the lower side of the panel 46 as by mounting screws as illustrated.

It will be seen that the orientation of the head 45 produces, and is indicated by, the relative positions of the slide plates 50 and 51. The positions of the slide plates 50 and 51 are directly related to the X and Y-axis vector components which indicate the orientation of the head 45. In view of the direct relationship between the speed and direction of the output shaft 52f of the integrator 52 and the position of slide plate 50, the speed and direction of the output shaft 52f indicates the X-axis vector component of the orientation of head 45. The same applies for the output shaft 53f of integrator 53, the speed and direction of which indicates the Y-axis vector component of the head orientation.

The output shaft 52f revolves the output gear 52g which supplies rotary motion into a gear train 55a through 55g. The gears 55a and 55b are of identical size, and the gears 55c through 55g are each progressively larger as to revolve at progressively slower speeds. As compared to gear 55b, the speed ratios of gears 55c through 55g are the inverse of 2, 3, 4, 5, and 10. The several gears 55a through 55g are respectively connected to the rotor shafts of X-axis synchro control transformers 57a through 57g.

Similarly, the gear 53g on the output shaft of integrator 53 drives a gear train 56a through 56g wherein gears 56a and 56b have identical sizes and speeds and gears 56c through 56g are progressively larger and revolve at progressively slower speeds at the ratios of the inverse of 2, 3, 4, 5 and 10. The gears 56a through 56g are connected to the rotor shafts of the Y-axis synchro control transformers 58a through 58g.

The head 45 is revolved by a reversible motor 59 which is mounted on the panel 46 and drives through a sprocket 59a and belt 59b which is trained around the sprocket 60 on the head spindle 45a. The drive belt 59b also is trained around the sprocket 60a of the cutter offset rotor 60 which is journalled on the panel 46 adjacent the head 45 in bearings 60b. The rotor base 61 has a groove 62 formed on a diameter thereof and having precision raceways 62a formed in the sides thereof to receive ball bearings 63 which mount a slide bar 64 movable along a diameter of the rotor base 61. The slide 64 carries a crank pin 65 on which is mounted a pair of rotary discs 66 and 67.

The edges of discs 66 and 67 abut against the end edges of slide plates 68 and 69 respectively which are guided by rollers 68a and 69a. The rollers 68a and 69a are suspended from the panel 46 on fittings or brackets 68b and 69b respectively. It will be noted that the slide plates 68 and 69 are oriented to move in directions normal to each other; and the slide plates 68 and 69 are continuously urged against their respective discs 66 and 67 by springs 68c and 69c. The springs are anchored to the crank pin 65 and are also anchored at their outer ends to pins 68d and 69d respectively. The slide plates 68 and 69 carry gear racks 70 and 71 which mesh with rotary gears 70a and 71a on the rotors of synchro differential transmitters 72 and 73 respectively which are affixed on the adjacent brackets 68b and 69b respectively. The rotors of the transmitters 72 and 73 turn with a linear response relative to movement of the slides 68 and 69, thereby producing a rotation of the slave lead screws to accurately compensate for the radius or reach of the tool 16d.

The position of the slide 64 along the diameter of the rotor base 61 is controlled by a rotatable shaft 74 journalled in a bearing 61a in the base of the rotor and connected at its lower end to a precision pinion 75 which is meshed with a gear rack 75a affixed on the slide 64. The upper end of shaft 74 is connected to a control knob 74a at the level of deck 22, a pair of discs 74b and 74c also revolve with the shaft 74 and the knob and the disc 74c is normally locked against rotation by a thumb screw 76 which is threaded into the closure plate 60c of the rotor. Calibrations and index markings are provided on disc 74c and plate 60c to indicate the eccentricity of pin 65.

As hereinafter more fully pointed out, the movement of the crank pin 65 across the diameter of the rotor 60 and out of alignment with the rotation axis thereof produces a cutter offset so as to compensate for the radius of the milling tool when shaping a workpiece in accordance with the line drawing 26 which will be prepared in accordance with the exact proportionate shape of the workpiece periphery.

The head 45 has a pair of mounting rods 77 supported at one end from the cylindrical sidewall 45a, and supported at the other end by an adjustable bracket 77a secured to the bottom wall 45b. The rods 77 carry a bracket base 78 to which upright fore and aft mounting panels 78a are secured. Adjustable mounting plates 78b are carried on the upright panel 78a by stud and spring clip assemblies 78c to permit vertical adjustment of the panels 78b.

Figure 8:
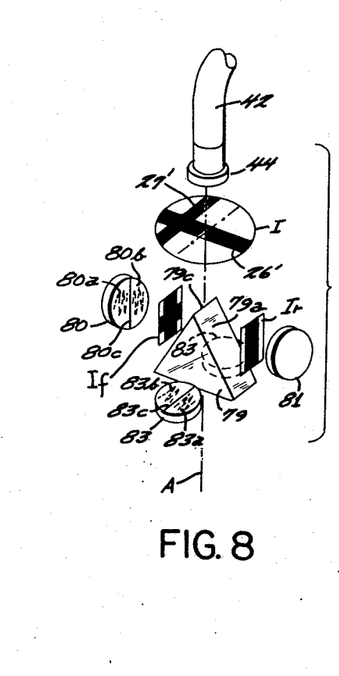
FIG. 8 is a diagrammatic illustration, illustrating in slightly exaggerated condition, the principal image transmitting and sensing elements in the head and also illustrating certain images which would appear in normal operation of the tracing machine.

An image divider 79 is affixed on the bracket base 78 and has mirror surfaces 79a and 79b oriented substantially normal to each other and extending obliquely upwardly to a sharply defined edge 79c through which the rotation axis A of the head 45 extends. The image divider 79 is somewhat prism shaped so that the image I transmitted by the lens assembly 44 along the rotation axis A will be split at the edge 79c, and in a direction transversely across the image 26' of the minute reference portion of the line drawing, and thereby causing portions of the image I to be reflected in opposite directions as discrete sensible images $I_f$ and $I_r$ and toward the photocells 80 and 81. The photocells 80 and 81 will therefore "view" portions of the line 26 of the drawing ahead of and rearwardly from the center of lens assembly 41. In the normal forward travel of the line follower 31 along the line drawing 26, the image $I_f$ is sensed by the photocell 80 to anticipate changes of direction of the line 26 for use in steering the line follower 31, however without requiring reorientation of the head 45, the line follower 31 may be moved in the opposite direction along the line 26 by merely switching the photocell 81 into operative relationship for sensing the discrete image $I_r$ for use in controlling the steering.

The photocells 80 and 81 are identical, and each of the cells has a pair of balanced sensing portions 80a, 80b, 81a, 81b on opposite sides of neutrals 80c, 81c. In a manner well known to persons of skill in the art, the photocell portions are arranged in a bridge circuit to balance against each other when the image at opposite sides of the neutral 80c is identical, but when unbalance occurs between the cell sections 80a, 80b, the error signal produced causes the control circuitry 82 to respond and produce rotation of the head operating motor 59 so as to revolve the head 45 sufficiently and in the proper direction as to re-establish a balanced condition at the photocell 80. The resulting re-orientation of head 45 causes movement of the crank pin 47, resulting in a change in the output of the ball disc integrators 52, 53 and thereby changing the rotation rate of the synchro control transformers and accordingly changing the rotation rates of the X and Y axis lead screws of the tracer and slave machine.

An additional pair of photocells 83 are mounted on the bracket base 78 at the opposite sides of the line divider 79 so as to receive the transverse side portions of the image I. The photocells 83 also have separate cell portions 83a, 83b and neutrals 83c which are in a single common upright plane which also includes the rotation axis A and the edge 79c of the line divider. The photocells 83 are provided to respond to the image 27' of the transverse line 27 in the drawing which indicates the location of a desired center. When the image 27' is sensed by the photocells 83, the balanced condition between the cell portions 83a and 83b will be utilized by the control circuitry 84 to effect stopping of the ball disc integrator drive motor 54, thereby resulting in stopping of the center line of the line follower head 31, at the intersection of the line drawing 26 and the transverse line 27.

Figure 9:
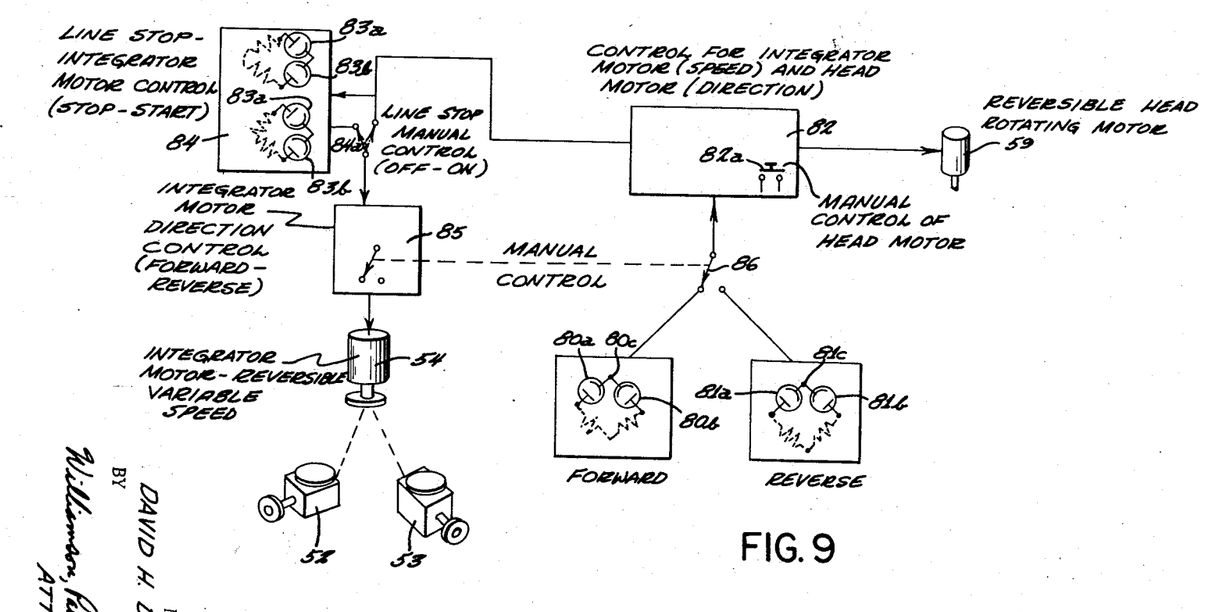
FIG. 9 is a diagrammatic sketch and block diagram illustrating important aspects of the control system.

In addition, with respect to the controlling of the integrator motor 54, it will be noted that the control circuitry 82, when responding to an error signal detected at the photocell 80, will provide a control on the motor 54, causing the motor 54 to slow down so that the change in direction of the follower head 31 and of the workpiece with respect to the tool 16d may be properly effected. This slowing of the motor 54 in response to the error signal from the photocell is provided regardless of whether the line stop control circuitry 84 is switched into or out of the circuit by the manual control switch 84a. It should be noted that after the motor 54 has stopped in response to the detection by photocells 83a of the image 27', the motor 54 must be started through a manual control such as the temporary operation of the switch 84a to the dotted line position thereof as shown in FIG. 9. Return of the switch 84a to include the line stop control circuitry 84 in the circuit will have no effect upon the operation of the motor 54 until another image 27' is detected.

Integrator motor 54 may be reversed by the direction control 85 which is operated in co-operation with the switch 86 which controls selection of the proper photocell 80, 81 to correspond to the direction of travel of the line follower head 31 along the line 26. When the movement along the line is to be reversed, the photocell 81 is switched into operative relationship and the integrator motor 54 is reversed as to direction. The photocell 81 will thereupon sense the image $I_r$ for properly anticipating the changes in direction of the line being followed by the head 31.

The degree of anticipation by the photocells 80, 81 may be changed by adjusting the mounting plates 78b upwardly and downwardly in the head 45.

A manual control 82a is provided for intentionally rotating the head motor 59 and thereby orienting the head 45 in a particular direction. This function is particularly useful in initially positioning the line follower head 31 above the line 26 of the line drawing. When the follower head 31 is being initially moved, the motor 59 is revolved until the head 31 starts toward the line 26. The image I will contain no detectable line image, but because the opposite portions 80a, 80b of the photocell 80 are balanced, the head motor control 82 will allow the motor 59 to remain stationary. When the head 31 reaches the line 26, an approximate adjustment may have to be made by operation of the switch 82 to revolve the head 45 in an approximate direction, whereupon the automatic control will take over and produce the proper and desired alignment.

Figure 10:
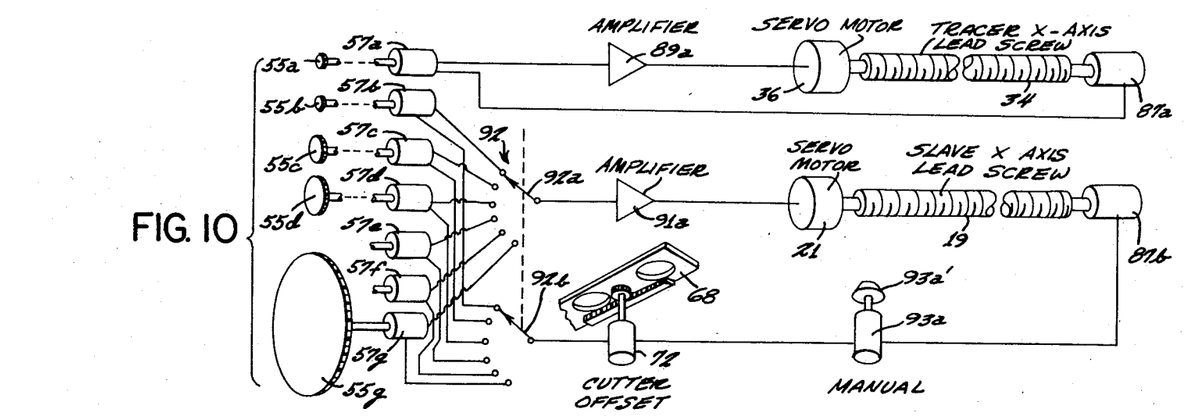
FIG. 10 is a diagrammatic sketch and block diagram of the synchro control system of the X-axis lead screws of the tracer and slave machine.
Figure 11:
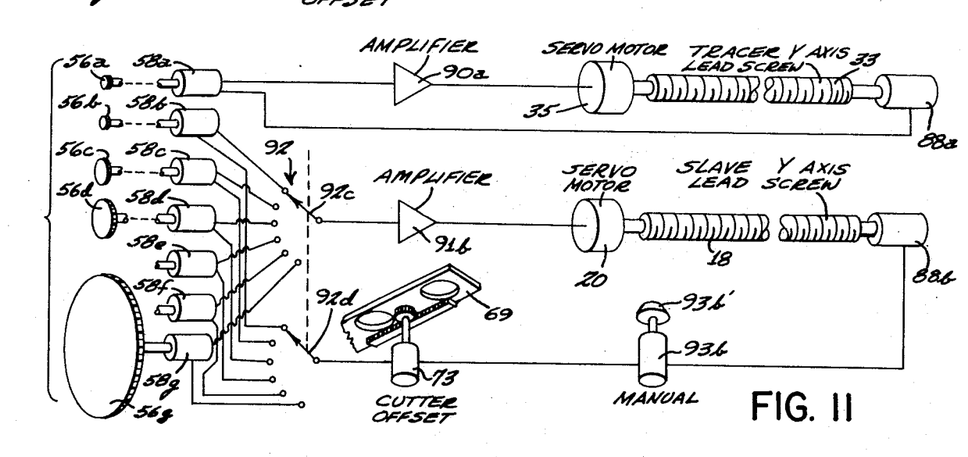
FIG. 11 is a diagrammatic sketch and block diagram of the synchro control system of the Y-axis lead screws of the tracer and slave machine.

With reference to FIGS. 10 and 11 it will be noted that each of the X-axis lead screws 19 and 34 and the Y-axis lead screws 18 and 33 have synchro control transmitters 87a, 87b, and 88a, 88b, with the rotors thereof connected in driven relationship to the respective lead screws. The synchro transmitters 87a, 88a are connected to the control transformers 57a, 58a for sensing a difference in the rotary position of their respective rotors, thereby generating error signals which are transmitted through amplifiers 89a, 90a to effect operation of servo-motors 36, 35 respectively. The servo-motors will revolve the lead screws so as to satisfy the error signal between the synchro control transmitters 87a, 88a and the synchro control transformers 57a, 58a which is caused by rotation of the rotors of the synchro control transformers 57a, 58a through rotation of gears 55a, 56a respectively.

In the synchro control system for the lead screw 19, the servo-motor 21 is operated in response to the output from amplifier 91a which responds to an error signal received from one of the synchro control transformers 57b–57g through a multi-position selector switch 92a which is a part of a rotary gang switch 92 which also includes switches 92b, 92c and 92d.

The feed-back from the synchro control transmitter 87b is directed to the corresponding synchro control transformer through the selector switch 92b and through synchro differential transmitters 72 and 93a which is manually controllable by operation of the control knob 93a'.

In a similar manner, servo-motor 20 is operated in response to the output of the amplifier 91b produced by an error signal from one of the synchro control transformers 58b–58g through the selector switch 92c. The feedback from the synchro control transmitter 88b of the Y-axis lead screw 18 of the slave machine 16 is directed through a corresponding selector switch 92d to the corresponding synchro control transformer, and also through the synchro differential transmitters 73 and 93b, the rotor of which is manually controllable through operation of the manual control knob 93b'.

The selector switch 92, will in various settings, substitute various synchro control transmitters for correspondingly controlling the X- and Y-axis lead screws in the slave machine, thereby effecting the desired proportionate reduction in the magnitude of relative movement between the workpiece on the bed 16h and the tool 16b. For instance, if the periphery of the workpiece is to have a size reduced by a factor of ten as compared to the size of the shape defined by the line 26 on the drawing 25, the switch 92 will be operated so as to connect the synchro control transformers 57g and 58g into the control circuits for producing the error signals for lead screws 19 and 18 respectively. As a result, the periphery of the workpiece will have a size one-tenth ($\frac{1}{10}$) of that of the configuration of line 26.

Insofar as the synchro differential transmitters 72, 93a, 73, 93b remain stationary, no effect is produced thereby upon the creation of the error signal introduced into the amplifiers 91a, 91b or upon the rotation of the lead screws 19 and 18. The manually operated synchro differential transmitters 93a, 93b are commonly used to position the bed 16h, and the workpiece carried thereon with respect to the tool 16d in preparation for the start of an operation of shaping a workpiece. Simply by revolving the control knobs 93a' and 93b', and regardless of whether error signals are being introduced as a result of rotation of the gears 55a–55g, 56a–56g and the corresponding rotors of the control transformers, error signals are introduced into the servo loop so as to effect operation of the motors 20, 21 and thereby provide the desired preliminary positioning of the bed 16h and the workpiece with respect to the tool. Ordinarily there is no reason for operating the synchro differential transmitters 93a, 93b during the actual shaping of a workpiece.

When the tracer is operated with the slide 64 positioned with respect to the tool offset rotor 60, such that the crank pin 65 is in alignment with the rotation axis of the rotor 60, the synchro differential transmitters 72, 73 have no effect upon the error signal applied to the amplifiers for controlling the slave lead screws servo-motors 20, 21. As a result, the exact proportionate shape of the line 26 is reproduced in the relative travel between the workpiece and center of tool 16d in the slave machine. The periphery of the workpiece is changed (ordinarily reduced), by a constant dimension, regardless of the setting of selector switch 92, equaling the radius or working reach of the tool. This setting of the crank pin 65 is useful in utilizing drawings which have been previously prepared and wherein a dimensional allowance has been provided for the size of the tool to be employed.

However, it is obviously substantially simpler to make the drawing 25 so that the line 26 circumscribes the exact proportionate shape of the workpiece to be produced. In utilizing such a drawing, the slide 64 is moved to position the center of the crank pin 65 at a scaled distance from the rotation axis of rotor 60, which in the present embodiment of the machine equals the radius or reach of the tool 16d. The radius between the rotation axis of rotor 60, and the pin 65 manifests, in both length and direction, the offset vector indicating the relative position of the center of the tool and the desired periphery of the workpiece upon which the tool is operating at any particular moment. The relative positions of the slides 68 and 69 are indicative of the X and Y axis vector components of the offset vector. The offset vector maintains a relationship substantially normal to the minute portion of the image 26' at the rotation axis of the head 45. As the image 26' turns in the image I transmitted from the scanning lens assembly 41, the offset vector must also proportionally turn, and this is accomplished by the coordinated rotation of the rotor 60 with the head 45. The corresponding linear movement of slides 68, 69 produces a corresponding rotation of the rotors of the synchro differential transmitters to introduce indications for producing additional error signals in the servo loops and produce added (positive or negative) movement of the X and Y axis lead screws in accordance with the X and Y axis vector components of the offset vector.

The result obtained at the workpiece is that the periphery of the tool, as the circumferential shape of the workpiece is progressively defined, follows the exact path of the line 26 of the drawing, and therefore the shape of the workpiece is the exact shape of the line 26 indicated in the drawing.

In the event that it is determined that the size of the tool 16h has been decreased, due to wear, by a small amount (such as 0.0002 inch) a corresponding adjustment can be made in the position of the crank pin 65 so as to change the length of the offset vector.

Also if it is desired to initially make a rough cut on the workpiece, followed by a finishing operation, the position of slide 64 and crank pin 65 may be adjusted so that the tool removes all of the stock from the periphery of the workpiece except for a few thousandths of an inch for the rough cut, and then the position of slide 64 and crank pin 65 may be adjusted to compensate for the exact radius or working reach of the tool so as to finish the forming of the periphery of the workpiece to the exact proportionate shape as defined by the line 26 in the drawing.

Figure 13:
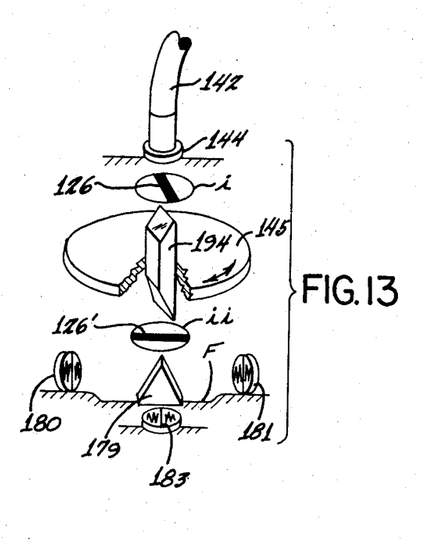
FIGS. 13 and 14 are diagrammatic perspective views of modified forms of image receiving and translating mechanisms.

FIG. 13 illustrates, diagrammatically, that a modified construction of apparatus may be substituted for the image receiving head in the machine hereinbefore described, and wherein the photocells 180, 181 are affixed to and stationary with the frame F of the tracer. The image divider 179 and photocells 183 for sensing the transverse line for defining a center at which the slave machine is to be stopped, are also mounted on and stationary with the frame F. The coherent fiber optics bundle 142 transmits the image $i$ wherein the minute portion of the line appears as an image 126' and the orientation of the line image 126' will vary as the direction of the line varies at the line following head.

Whereas it is necessary to continuously present the image $ii$ to the line divider 179 so that portions of the line image 126' will be reflected to the photocells 180, 181, an image rotating prism 194 is positioned between the image divider 179 and the lens assembly 144 at the end of the fiber optics bundle, and mounted on a rotor 145 so as to turn the prism 194 to a correct orientation so as to continuously maintain the line image 126' as illustrated and for reflection into the photocells. The prism 194 is a commercially available product and causes the output image $ii$ to vary in a precise manner as to orientation as compared to the input image $i$. As hereinbefore described, the error signals produced at the photocells can be utilized for revolving the rotor 145 and maintaining the rotor and prism 194 in the desired orientation.

In a manner hereinbefore described in connection with head 45, the orientation of rotor 145 may be sensed with the ball disc integrators to provide a rotary input for the synchro control transformers of the synchro control system. It is emphasized that additional flexibility in operation and control of the tracer is obtained because of the mounting of the photocells on the frame of the machine.

Figure 14:
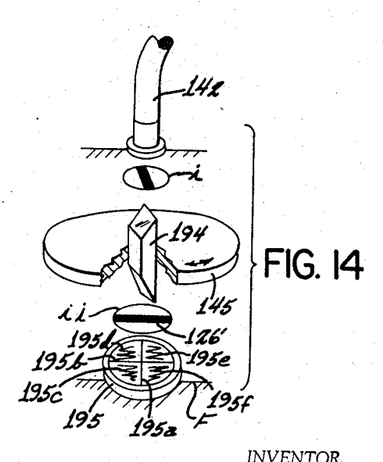

IN FIG. 14 is illustrated a further modified form of image receiving and sensing apparatus, similar to that of FIG. 13, insofar as the image $i$ is transmitted by the fiber optics bundle 142 through the prism 194 on rotor 145 so as to maintain the image $ii$ in a predetermined relation to the frame F of the tracer. In this form of the invention, a photocell 195 has a neutral 195a constituting an image divider for dividing the line image 126' transversely there across and at the rotation axis of the rotor 145. Another neutral 195b in the photocell corresponds to neutrals 80c and 81c so as to permit the balanced cell portions 195C and 195d to receive and view a portion of the image 126' and balance against each other or create an error signal in order to produce the necessary turning of the rotor 145. Whereas the cell portions 195c, 195d view the image for forward running of the tracer and corresponding anticipation of line direction forwardly of the follower head 31, the other cell portions 195e, 195f are provided at the rear of the line divider neutral 195a for use in reverse running.

Further, by simple switching, cell portions 195d, 195e may be utilized as a co-operating pair to be balanced against each to provide the line stop function, otherwise provided by cells 83 in the form hereinbefore disclosed; and similarly, cell portions 195c and 195f are used in balance against each other in the line stop function. It is to be noted that the form of the invention shown in FIG. 14, the image $ii$ is again maintained in predetermined relation with the frame F of the tracer and in this form, the line image 126' is divided for anticipation by the line divider or neutral 195a.

It will be seen that I have provided a new and novel tracer and control system for a milling machine or other machine wherein the tool and workpiece may be moved relative to each other along X and Y axes, so as to facilitate simple and easy reversal of direction of the tracer along the line and the corresponding reversal of direction of the tool and workpiece; and also wherein is provided a simple and rugged precision adjustment producing a tool offset so as to permit the drawing to be made exactly according to the proportionate size of the workpiece to be produced, while providing for offsetting of the tool and workpiece relative to each other and thereby making allowance for the working radius or reach of the tool and facilitating utilization of tools of different diameters without changing the drawing to be followed; which tool offset function is provided by the introduction of an error signal in the synchro control system which controls the movement of the X and Y axis lead screws of the slave machine; and also wherein the tracer is provided with a simple and lightweight line following head from which the image of a minute portion of the line is transmitted by a flexible coherent fiber optics bundle to a stationary head mounted on the frame for rotary movement following the orientation of the line at the follower head.

Of course it will be understood that various changes may be made in the form, details, arrangement and proportions of the various parts without departing from the scope of my invention.

What is claimed is:

1. In a control system for a slave machine wherein relative movement is produced between the scanning head and a drawing being followed in a tracer and corresponding relative movement is produced between the tool and workpiece in the slave machine and in response to control signals indicating speed and also indicating the direction of a minute reference portion of the line of the drawing on the tracer producing the signals, the configuration of the path followed by the tool corresponding proportionately to the configuration of the line in the drawing, the improvement comprising orienting means producing a second indication of a second direction, normal to said first-mentioned direction of the minute reference portion of the line, additional means producing an additional indication of length corresponding to the offset of the tool from the path otherwise followed by the tool relative to the workpiece, and operative means producing additional translation between tool and workpiece in response to said second indication and said additional indication without producing corresponding translation between the scanning head and drawing to continuously maintain the tool at an offset position at a preset distance from and normal to said path while relative movement between the tool and workpiece also continues in response to said control signals.

2. The invention according to claim 1, wherein the tracer and the slave machine have interconnected synchro control systems producing and employing said control signals to guide the tool in multiple directions about the workpiece, said operative means including synchro differential transmitters responding to sensed changes in direction of the line and the radius of curvature required by said preset distance to effect said direction changes and introducing said second and additional indications into the slave machine synchro control system to cause the tool to maintain said offset position along said path.

3. The invention according to claim 2, and controllable means varying said additional indications to adjust said distance.

4. The invention according to claim 2 and said orienting means having a direction responsive rotor oriented correspondingly to the direction of said minute reference portion of the line, the rotor having an eccentric on a radius normal to said orientation, mechanical means connecting said synchro differential transmitters to said eccentric to respond linearly to direction and magnitude of eccentricity and thereby produce said indications.

5. The invention according to claim 3 wherein said rotor has a slide movable transversely of the rotor axis, the slide carrying the eccentric, and means releasably securing the slide in fixed position on the rotor whereby to preset the distance to the modified path of the tool center.

6. The invention according to claim 5 and said slide being movable to carry said eccentric along a diameter of the rotor and in both directions from the axis.

7. In a control system for producing with a tool a workpiece configuration in a slave machine in response to following of a line on a drawing on a tracer and wherein relative movement in the slave machine and in the tracer is effected by X and Y axis lead screws operated by servomotors and synchro control systems, and wherein said tracer has rotor means sensing and rotating to an orientation corresponding to the direction of a minute sensed portion of the line and producing error signals in both the X and Y axis synchro control systems for following the line and producing relative movement between the workpiece and tool in the direction of the line, the improvement comprising an adjustable eccentric movable across a diameter of the rotor means, X and Y axis slides movable normal to each other and engaging the eccentric to indicate by position, the direction and magnitude of the eccentric, said slides and eccentric being oriented with respect to each other and with respect to the rotor means to continuously indicate a direction of the eccentric normal to the direction of the sensed minute reference portion of the line, and synchro differential transmitters with rotors operating in linear response to movement of said slides and connected in the synchro control systems of the X and Y axis lead screws of the slave machine, said synchro differential transmitters producing error signals in response to sensed changes in the direction of the line to compensate for the working reach of the tool in the relative movement between the tool and the workpiece.

8. The invention according to claim 7, wherein said rotor means has a diametric guideway and a mounting bar in the guideway carrying the eccentric, a pinion on the rotor means, and a rack meshed therewith and secured to the mounting bar for moving the eccentric.

9. The invention according to claim 7 and said rotor means including an image receiving rotary head including sensors responding to the sensed portion of the line to initiate the rotation of the rotary head to the orientation of said sensed portion of the line, and a tool offset rotor drivably connected to said image receiving rotor head and revolving therewith, said tool offset rotor carrying said adjustable eccentric.

10. A control system for a slave machine, comprising a tracer with a scanning head to follow on the line of a drawing and view a minute reference portion of the line, means producing controlsignals indicating speed and indicating direction of the minute reference portion of the line of the drawing, tracer operating means responding to said control signals and producing movement of the scanning head in such a direction and with a magnitude as to follow along the line of the drawing, slave operating means also responding to said control signals and producing relative movement between the tool and workpiece in directions corresponding to the configuration of the drawing, said relative movement having a magnitude smaller than the magnitude of movement of the scanning head, one of said magnitudes being a multiple of the other magnitude of movement whereby the size of the workpiece will be in a certain ratio relative to the size of the drawing, orienting means responding to the indicated direction of the minute reference portion of the line and producing a second indication of a second direction normal to said indicated direction of the minute reference portion of the line, additional means producing an additional indication of length corresponding to the offset of the tool from the path otherwise followed by the tool relative to the workpiece, and operative means applying said second indication and said additional indication to said slave operating means only, and thereby producing additional translation between tool and workpiece in response to said second indication and said additional indication to continuously maintain the tool at an offset position at a preset distance from and normal to said path while relative movement between the tool and workpiece continues.

References Cited

UNITED STATES PATENTS

| | | | |
|---|---|---|---|
| 2,989,639 | 6/1961 | Dulebohn et al. | 250—202 |
| 3,073,962 | 1/1963 | Neander et al. | 250—202 |
| 3,268,731 | 8/1966 | Brouwer et al. | 250—202 |
| 3,301,543 | 1/1967 | Semper | 250—202 X |
| 3,335,287 | 8/1967 | Hargens | 250—202 X |
| 3,406,290 | 10/1968 | Brueschke | 250—227 X |

JAMES W. LAWRENCE, Primary Examiner

E. R. LAROCHE, Assistant Examiner

U.S. Cl. X.R.

318—18